(12) United States Patent
Choi et al.

(10) Patent No.: US 11,822,078 B2
(45) Date of Patent: Nov. 21, 2023

(54) HEAD-MOUNTED DISPLAY SYSTEM

(71) Applicant: Apple Inc., Cupertino, CA (US)

(72) Inventors: Hyungryul Choi, San Jose, CA (US);
Eric J. Hansotte, Morgan Hill, CA (US); Guolin Peng, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 16/488,806

(22) PCT Filed: Feb. 28, 2018

(86) PCT No.: PCT/US2018/020311
§ 371 (c)(1),
(2) Date: Aug. 26, 2019

(87) PCT Pub. No.: WO2018/164914
PCT Pub. Date: Sep. 13, 2018

(65) Prior Publication Data
US 2020/0310121 A1     Oct. 1, 2020

Related U.S. Application Data

(63) Continuation of application No. 15/894,736, filed on Feb. 12, 2018, now abandoned.
(Continued)

(51) Int. Cl.
*G02B 27/01* (2006.01)
*G02B 27/28* (2006.01)
(Continued)

(52) U.S. Cl.
CPC .......... *G02B 27/0172* (2013.01); *G02B 5/32* (2013.01); *G02B 6/005* (2013.01); *G02B 6/0023* (2013.01);
(Continued)

(58) Field of Classification Search
CPC .. G02B 27/0172; G02B 27/281; G02B 6/005; G02B 6/0076; G02B 5/32; G02B 6/0023;
(Continued)

(56) References Cited

U.S. PATENT DOCUMENTS 6,750,996 B2 *   6/2004   Jagt ..................... G02B 6/0056
                                                        359/15
8,508,848 B2    8/2013   Saarikko
(Continued)

FOREIGN PATENT DOCUMENTS

CN            1559000 A        12/2004
CN          101738742 A         6/2010
(Continued)

*Primary Examiner* — Jade R Chwasz
(74) *Attorney, Agent, or Firm* — Treyz Law Group, P.C.; Michael H. Lyons (57) ABSTRACT

An electronic device such as a head-mounted display may have a display system that produces images. The display system may have one or more pixel arrays (26-1, 26-2) such as liquid-crystal-on-silicon pixel arrays. Images from the display system may be coupled into a waveguide (116) by an input coupler system (114X, 114Y) and may be coupled out of the waveguide in multiple image planes using an output coupler system (120X, 120Y). The input and output coupler systems may include single couplers, stacks of couplers, and tiled arrays of couplers. Multiplexing techniques such as wavelength multiplexing, polarization multiplexing, time-division multiplexing, multiplexing with image light having different ranges of angular orientations, and/or tunable lens techniques may be used to present images to a user in multiple image planes.

20 Claims, 10 Drawing Sheets

Related U.S. Application Data (60) Provisional application No. 62/468,109, filed on Mar. 7, 2017.

(51) Int. Cl.
  *G02B 5/32* (2006.01)
  *F21V 8/00* (2006.01)

(52) U.S. Cl.
  CPC ......... *G02B 6/0076* (2013.01); *G02B 27/281* (2013.01); *G02B 2027/014* (2013.01); *G02B 2027/0174* (2013.01)

(58) Field of Classification Search
  CPC ...... G02B 2027/014; G02B 2027/0174; G02B 27/0093; G02B 2027/0187; G02B 2027/0138; G02B 6/34
  See application file for complete search history.

(56) References Cited

U.S. PATENT DOCUMENTS

| | | | |
|---|---|---|---|
| 9,310,559 B2 * | 4/2016 | Macnamara | G02B 30/50 |
| 9,766,381 B2 | 9/2017 | Jarvenpaa et al. | |
| 9,904,058 B2 * | 2/2018 | Yeoh | G02B 6/0016 |
| 10,451,799 B2 | 10/2019 | Klug et al. | |
| 10,534,179 B1 * | 1/2020 | Ahuja | G02B 26/0833 |
| 10,539,799 B2 | 1/2020 | St. Hilaire | |
| 10,746,999 B2 | 8/2020 | Browy et al. | |
| 10,908,423 B2 | 2/2021 | Oh | |
| 10,983,263 B2 | 4/2021 | Kleinman et al. | |
| 11,112,865 B1 * | 9/2021 | Fix | G06F 3/017 |
| 11,391,951 B2 | 7/2022 | Browy et al. | |
| 11,460,609 B2 | 10/2022 | Peroz et al. | |
| 2015/0205126 A1 * | 7/2015 | Schowengerdt | G02B 3/0006 |
| | | | 345/633 |
| 2016/0116739 A1 * | 4/2016 | TeKolste | G02B 6/0076 |
| | | | 385/36 |
| 2022/0099974 A1 * | 3/2022 | Han | G02B 27/286 |

FOREIGN PATENT DOCUMENTS

| | | |
|---|---|---|
| CN | 103946732 A | 7/2014 |
| CN | 104737061 A | 6/2015 |
| CN | 104956252 A | 9/2015 |
| CN | 105549150 A | 5/2016 |
| CN | 105934902 A | 9/2016 |
| EP | 2196729 A1 | 6/2010 |
| WO | 03027569 A1 | 4/2003 |
| WO | 2013188464 A1 | 12/2013 |

* cited by examiner

HEAD-MOUNTED DISPLAY SYSTEM

This application claims priority to U.S. patent application Ser. No. 15/894,736, filed on Feb. 12, 2018, and provisional patent application No. 62/468,109, filed on Mar. 7, 2017, which are hereby incorporated by reference herein in their entireties.

BACKGROUND

This relates generally to devices with displays, and, more particularly, to head-mounted displays.

Head-mounted displays may be used to display virtual reality and augmented reality content. A head-mounted display that is displaying augmented reality content may overlay computer-generated images on real-world objects. Displays and optical systems may be used to create images and to present those images to a user.

If care is not taken, however, the components used in displaying content for a user in a head-mounted display may be unsightly and bulky and may not exhibit desired levels of optical performance.

SUMMARY

An electronic device such as a head-mounted display may have a display system that produces images. An optical system with one or more waveguides and input and output coupler systems may be used to distribute the images to a user.

The display system may have one or more pixel arrays such as liquid-crystal-on-silicon pixel arrays. Images from the display system may be coupled into one or more waveguides by an input coupler system and may be coupled out of the waveguide in multiple image planes using an output coupler system. The input and output coupler systems may include single couplers, stacks of couplers, and tiled arrays of couplers. The couplers may be thin planar volume holograms or other optical couplers for coupling light into and out of the upper and lower surfaces of elongated strip-shaped waveguides.

Multiplexing techniques such as wavelength multiplexing, polarization multiplexing, time-division multiplexing, angular multiplexing with image light having different ranges of angular orientations, and/or lens tunable techniques may be used to present images to a user in multiple image planes.

DETAILED DESCRIPTION

Head-mounted displays and other devices may be used for virtual reality and augmented reality systems. These devices may include portable consumer electronics (e.g., portable electronic devices such as cellular telephones, tablet computers, glasses, other wearable equipment), head-up displays in cockpits, vehicles, etc., display-based equipment (projectors, televisions, etc.). Devices such as these may include displays and other optical components. Device configurations in which virtual reality and/or augmented reality content is provided to a user with a head-mounted display are described herein as an example. This is, however, merely illustrative. Any suitable equipment may be used in providing a user with virtual reality and/or augmented reality content.

A head-mounted display such as a pair of augmented reality glasses that is worn on the head of a user may be used to provide a user with computer-generated content that is overlaid on top of real-world content. The real-world content may be viewed directly by a user through a transparent portion of an optical system. The optical system may be used to route images from one or more pixel arrays in a display system to the eyes of a user. Waveguides may be included in the optical system. Input optical couplers may be used to couple images into the waveguides from one or more pixel arrays. Output optical couplers may be used to couple images out of the waveguides for viewing by the user. The output couplers can be configured to display images in multiple image planes.

The input and output couplers for the optical system may form structures such as Bragg gratings that couple light into the waveguides from the displays and that couple light out of the waveguides in multiple image planes for viewing by the user. Input and output optical couplers may be formed from volume holograms or other holographic coupling elements. The input and output couplers may, for example, be formed from thin layers of polymers and/or other optical coupler structures in which holographic patterns are recorded using lasers. In some configurations, optical couplers may be formed from dynamically adjustable devices such as adjustable gratings formed from microelectromechanical systems (MEMs) components, liquid crystal components (e.g., tunable liquid crystal gratings, polymer dispersed liquid crystal devices), or other adjustable optical couplers.

Figure 1:
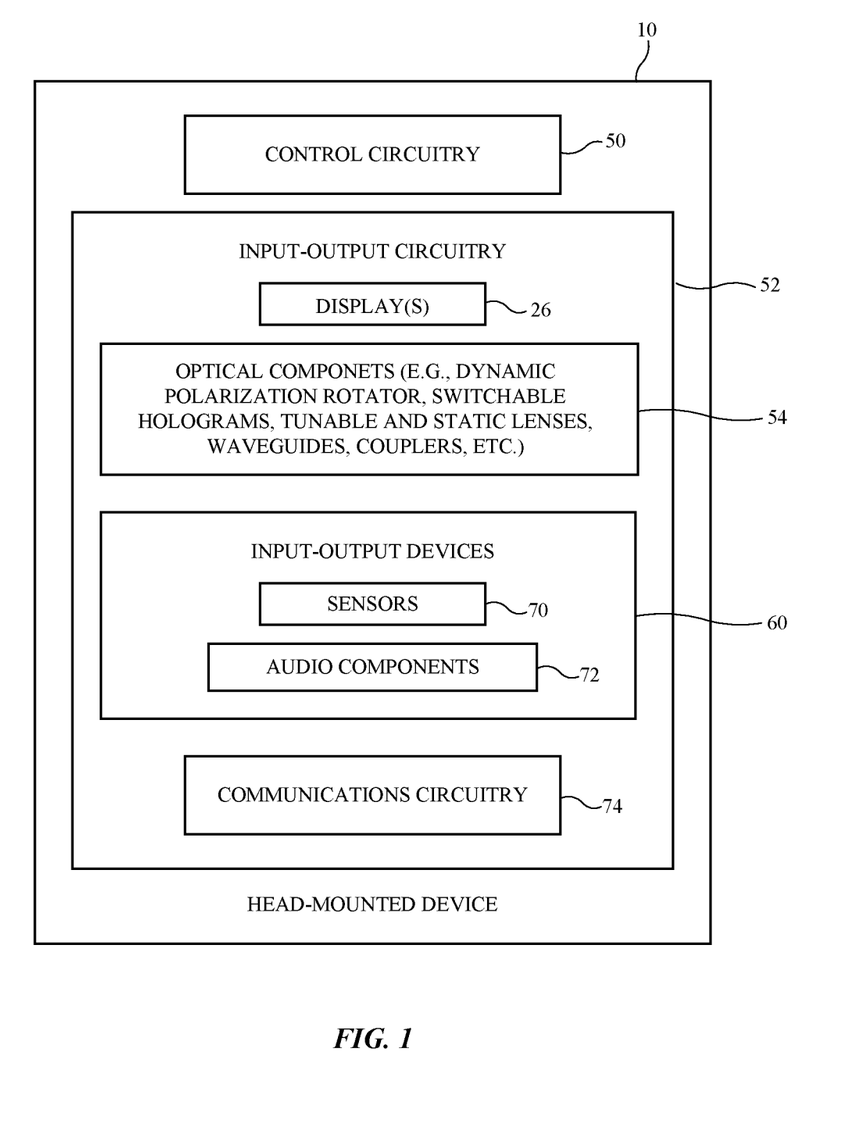
FIG. 1 is a schematic diagram of an illustrative head-mounted display in accordance with an embodiment.

A schematic diagram of an illustrative head-mounted display is shown in FIG. 1. As shown in FIG. 1, head-mounted display 10 may have control circuitry 50. Control circuitry may include storage and processing circuitry for controlling the operation of head-mounted display 10. Circuitry 50 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 50 may be based on one or more microprocessors, microcontrollers, digital signal processors, baseband processors, power management units, audio chips, graphics processing units, application specific integrated circuits, and other integrated circuits. Software code may be stored on storage in circuitry 50 and run on processing circuitry in circuitry 50 to implement operations for head-mounted display 10 (e.g., data gathering operations, operations involving the adjustment of components using control signals, image rendering operations to produce image content to be displayed for a user, etc.).

Head-mounted display 10 may include input-output circuitry 52. Input-output circuitry 52 may be used to allow data to be received by head-mounted display 10 from external equipment (e.g., a tethered computer, a portable device such as a handheld device or laptop computer, or other electrical equipment) and to allow a user to provide head-mounted display 10 with user input. Input-output circuitry 52 may also be used to gather information on the environment in which head-mounted display 10 is operating. Output components in circuitry 52 may allow head-mounted display 10 to provide a user with output and may be used to communicate with external electrical equipment.

As shown in FIG. 1, input-output circuitry 52 may include one or more displays such as display(s) 26. Display(s) 26 may be used to display images for a user of head-mounted display. Display(s) 26 have pixel array(s) to generate images that are presented to a user through an optical system. The optical system may, if desired, have a transparent portion through which the user (viewer) can observe real-world objects while computer-generated content is overlaid on top of the real-world objects by producing computer-generated images on the display(s) 26.

Optical components 54 may be used in forming the optical system that presents images to the user. Components 54 may include static components such as waveguides, static optical couplers, and fixed lenses. Components 54 may also include adjustable optical components such as an adjustable polarizer, tunable lenses (e.g., liquid crystal tunable lenses, tunable lenses based on electrooptic materials, tunable liquid lenses, microelectromechanical systems (MLMS) tunable lenses, or other tunable lenses), a dynamically adjustable coupler (e.g., an adjustable MEMs grating or other coupler, an adjustable liquid crystal holographic coupler such as an adjustable liquid crystal Bragg grating coupler, adjustable holographic couplers (e.g., electro-optical devices such as tunable Bragg grating couplers, polymer dispersed liquid crystal devices), couplers, lenses, and other optical devices formed from electro-optical materials (e.g., lithium niobate or other materials exhibiting the electro-optic effect), or other static and/or tunable optical components. Components 54 may be used in receiving and modifying light (images) from display 26 and in providing images to a user for viewing. In some configurations, one or more of components 54 may be stacked, so that light passes through multiple components in series. In other configurations, components may be spread out laterally (e.g., multiple displays may be arranged on a waveguide or set of waveguides using a tiled set of laterally adjacent couplers). Configurations may also be used in which both tiling and stacking are present.

Input-output circuitry 52 may include components such as input-output devices 60 for gathering data and user input and for supplying a user with output. Devices 60 may include sensors 70, audio components 72, and other components for gathering input from a user or the environment surrounding device 10 and for providing output to a user. Devices 60 may, for example, include keyboards, buttons, joysticks, touch sensors for trackpads and other touch sensitive input devices, cameras, light-emitting diodes, and/or other input-output components.

Cameras or other devices in input-output circuitry 52 may face a user's eyes and may track a user's gaze. Sensors 70 may include position and motion sensors (e.g., compasses, gyroscopes, accelerometers, and/or other devices for monitoring the location, orientation, and movement of head-mounted display 10, satellite navigation system circuitry such as Global Positioning System circuitry for monitoring user location, etc.). Using sensors 70, for example, control circuitry 50 can monitor the current direction in which a user's head is oriented relative to the surrounding environment. Movements of the user's head (e.g., motion to the left and/or right to track on-screen objects and/or to view additional real-world objects) may also be monitored using sensors 70.

If desired, sensors 70 may include ambient light sensors that measure ambient light intensity and/or ambient light color, force sensors, temperature sensors, touch sensors, capacitive proximity sensors, light-based proximity sensors, other proximity sensors, strain gauges, gas sensors, pressure sensors, moisture sensors, magnetic sensors, etc. Audio components 72 may include microphones for gathering voice commands and other audio input and speakers for providing audio output (e.g., ear buds, bone conduction speakers, or other speakers for providing sound to the left and right ears of a user). If desired, input-output devices 60 may include haptic output devices (e.g., vibrating components), light-emitting diodes and other light sources, and other output components. Circuitry 52 may include wired and wireless communications circuitry 74 that allows head-mounted display 10 (e.g., control circuitry 50) to communicate with external equipment (e.g., remote controls, joysticks and other input controllers, portable electronic devices, computers, displays, etc.) and that allows signals to be conveyed between components (circuitry) at different locations in head-mounted display 10.

Figure 2:
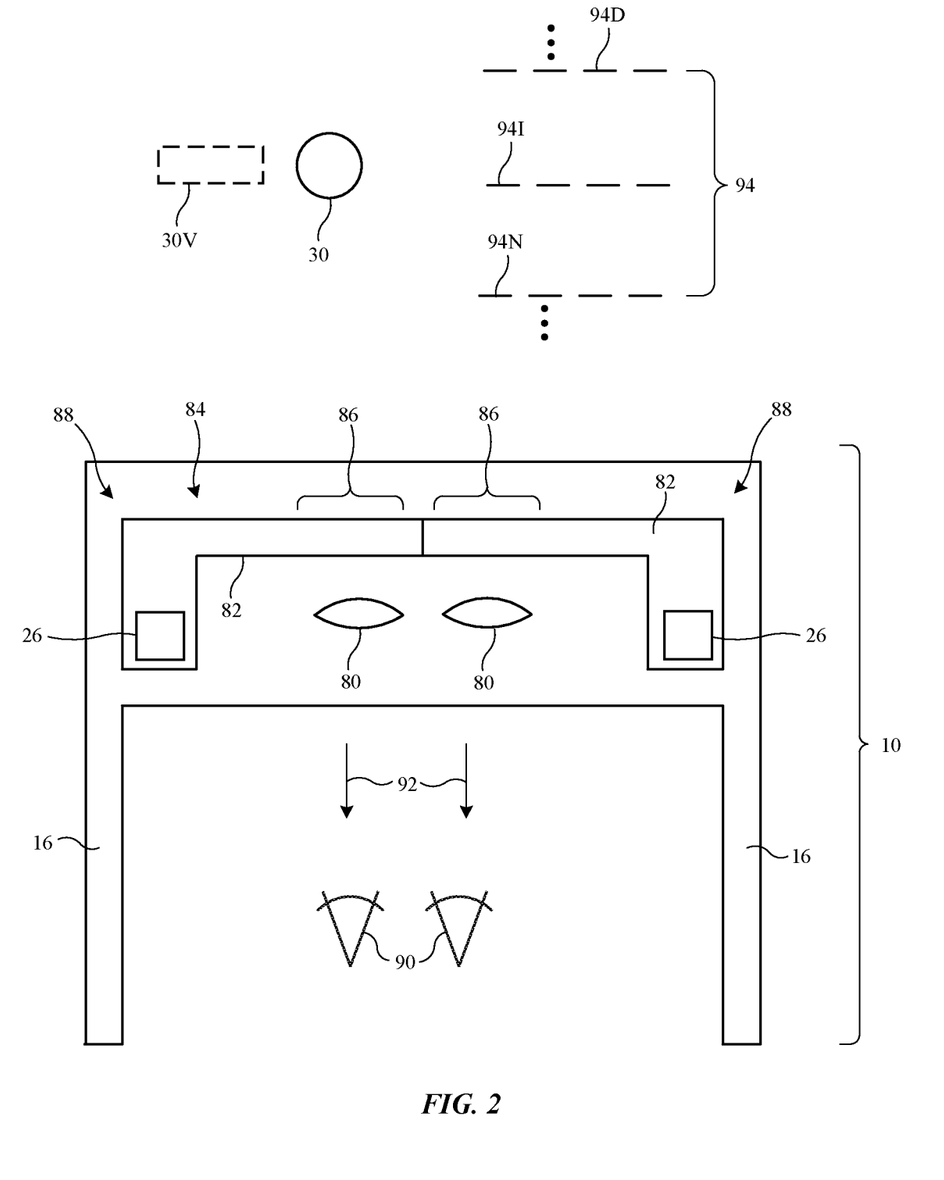
FIG. 2 is a top view of an illustrative head-mounted display in accordance with an embodiment.

The components of head-mounted display 10 may be supported by a head-mountable support structure such as illustrative support structure 16 of FIG. 2. Support structure 16 may be configured to form a frame of a pair of glasses (e.g., left and right temples and other frame members), may be configured to form a helmet, may be configured to form a pair of goggles, or may have other head-mountable configurations.

Optical system 84 may be supported within support structure 16 and may be used to provide images from displays 26 to a user (see, e.g., the eyes of user 90 of FIG. 2). With one illustrative configuration, displays 26 may be located in outer (edge) portions 88 of optical system 84 and may have one or more pixel arrays that produce images. Light associated with the images may be coupled into waveguides in outer portions 88 using input coupler systems. The waveguides may traverse intermediate regions 82. In central portion(s) 86 of system 84 (at the opposing ends of the waveguides from the input coupler systems and displays 26), output coupler systems formed from one or more output couplers may couple the light out of the waveguides. This light may pass through optional lenses 80 in direction 92 for viewing by user 90. Portion 86 of optical system 84 may be transparent, so that user 90 may view external objects such as object 30 through this region of system 84 while system 84 overlays computer-generated content (image content generated by control circuitry 50) with objects such as object 30.

Optical system 84 may be configured to display different images from displays 26 in different image planes 94 (e.g., virtual image locations at different respective distances from user 90). This allows distant objects (e.g., mountain peaks in a landscape) to be presented in a distant image plane 94 (see, e.g., far-field image plane 94D) and allows close objects (e.g., the face of a person in the user's field of view) to be presented in a close image plane (see, e.g., near-field image plane 94N), providing user 90 with three-dimensional image content. Yet other objects (see, e.g., virtual object 30V) may be presented in intermediate-distance image planes (e.g., intermediate image plane 94I, which is the same distance from user 90 as external object 30 in the example of FIG. 2). By displaying far objects in distant image planes and close objects in nearby image planes, three-dimensional imagery may be displayed naturally for the user with minimal eye fatigue and discomfort.

Figure 3:
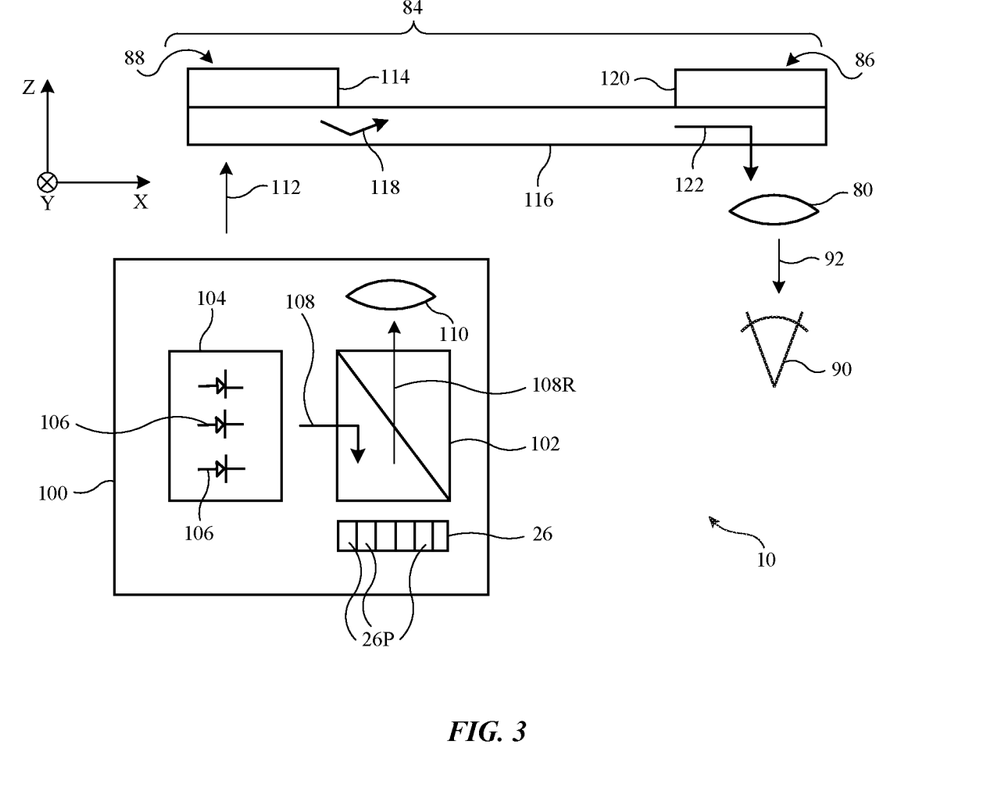
FIG. 3 is a diagram of an illustrative optical system and associated display system for a head-mounted display in accordance with an embodiment.

A portion of an illustrative head-mounted device is shown in FIG. 3. Device 10 may include one or more pixel arrays such as pixel array 26. Pixel array 26 is formed from pixels 26P. There may be any suitable number of pixels 26P in display 26 (e.g., 0-1000, 10-10,000, 1000-1,000,000, 1,000,000 to 10,000,000, more than 1,000,000, fewer than 1,000,000, fewer than 10,000, fewer than 100, etc.). Pixel array 26 may have any suitable type of display pixels (e.g., pixel array 26 may form a display such as an organic light-emitting diode display, a display having a pixel array formed from an array of light-emitting diodes each of which is formed from a respective crystalline semiconductor die, a liquid crystal display, a liquid-crystal-on-silicon display, a microelectromechanical systems display, or any other suitable display). In the illustrative configuration of FIG. 3, pixel array 26 forms part of display system 100 in which pixel array 26 is illuminated by light from an illumination system. The illumination system includes light source 104 and optical coupler 102. Light source 104 may include one or more light-emitting components 106. Components 106 may be, for example, light-emitting diodes such as red, green, and blue light emitting diodes, white light emitting diodes and/or light-emitting diodes, lamps, or other light sources of one or more other colors. Optical coupler 102 may be a beam splitter or other optical component(s) that helps direct light 108 from light source 104 toward pixel array 26.

As shown in FIG. 3, light 108 from light source 104 may be directed towards the surface of pixel array 26 (e.g., a liquid-crystal-on-silicon pixel array) by coupler 102. Light 108 is reflected by pixels 26P, which create an image for viewing by user 90. Reflected light 108R (e.g., image light corresponding to an image formed from the array of pixels 26P) passes through coupler 102 and optional lens 110. This reflected image light (image 112) is received by an input coupler system in input portion 88 of optical system 84.

As shown in FIG. 3, optical system 84 may include one or more waveguides such as waveguide 116. A left-hand waveguide for providing images to a user's left eye is shown in FIG. 3, but system 84 may, in general, include waveguide structures for providing image light to both of a user's eyes. Waveguide 116 may be formed from a transparent material such as clear glass or plastic. With one illustrative configuration, each waveguide 116 has an elongated strip shape that extends along axis X between opposing first and second ends. Waveguide 116 may, for example, have a height (width in dimension Y) of about 1 mm to 100 mm, at least 2 mm, at least 5 mm, less than 50 mm, or other suitable size. Waveguide 116 may have a thickness (in dimension Z) of about 3 mm, 1-5 mm, at least 0.1 mm, at least 0.5 mm, at least 1.5 mm, at least 3 mm, less than 4 mm, less than 5 mm, or other suitable thickness. In dimension X, a left-hand waveguide 116 may extend across about half of a user's face and a right-hand waveguide 116 may extend across the other half of the user's face. Accordingly, waveguides 116 may have lengths in dimension X of about 10 mm to 300 mm, at least 5 mm, at least 20 mm, at least 40 mm, at least 80 mm, at least 100 mm, at least 130 mm, less than 200 mm, less than 150 mm, less than 100 mm, less than 90 mm, etc. Waveguides 116 may be straight (as shown in FIG. 3) or may have a curved shape that wraps around a user's head.

System 84 may have an input coupler system in portion 88. The input coupler system may include one or more input couplers such as input coupler 114. Image light 112 from display 26 may be coupled into waveguide 116 using input coupler 114. Input coupler 114 of FIG. 3 is a reflective coupler (light reflects from coupler 114 into waveguide 116). If desired, input couplers such as input coupler 114 may be transmissive couplers (light is coupled into waveguide 116 upon passing through coupler 114).

Within waveguide 116, the light that has been coupled into waveguide 116 may propagate along dimension X in accordance with the principal of total internal reflection. Light 118 may then be coupled out of waveguide 116 by an output coupler system in output portion 86. The output coupler system may include one or more output couplers such as output coupler 120, which couple light 118 out of waveguide 116, as illustrated by light 122. Light 122 may then pass through lenses such as lens 80 in direction 92 for viewing by user 90.

The input and output couplers in system 84 may be holographic couplers (e.g., volume holograms). The couplers may be plane-to-plane couplers (infinite focal length) or may have an associated finite focal length f (e.g., these couplers may have an associated positive or negative lens power). The use of finite focal length output couplers may, as an example, be used to display images from pixel array 26 at multiple respective image planes.

Device 10 may use pixel array 26 to provide multiple images per unit time (e.g., per "frame" of image data). These images may be presented in multiple different focal planes 94, as shown in FIG. 2. Display 26 may present multiple images to a user through optical system 84 using a multiplexing scheme. The multiplexing scheme may be based on use of input and/or output couplers that are sensitive to particular polarizations (polarization multiplexing), may be based on use of input and/or output couplers that are sensitive to different wavelengths of light (wavelength division multiplexing), may be based on the use of input and/or output couplers that are sensitive to different angles of incoming/outgoing light (e.g., gratings that are configured to reflect light most effectively at different ranges of light ray angles of orientation or other light-angle multiplexing scheme), may use time division multiplexing, may use a tunable lens in the path of the light exiting display 26, and/or may use other suitable multiplexing techniques.

Figure 4:
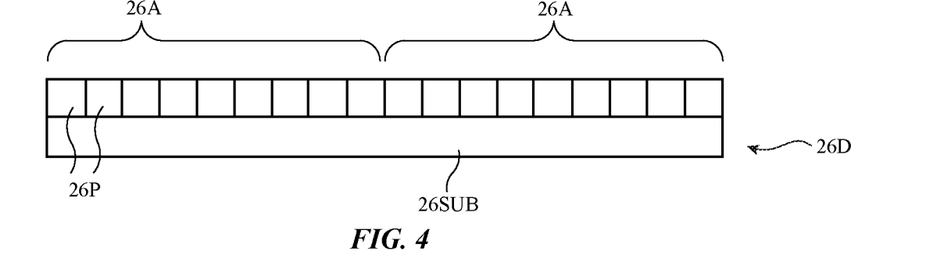
FIG. 4 is a cross-sectional side view of a display that includes multiple regions with multiple respective pixel arrays for producing images that are presented in multiple image planes by an optical system in accordance with an embodiment.
Figure 5:
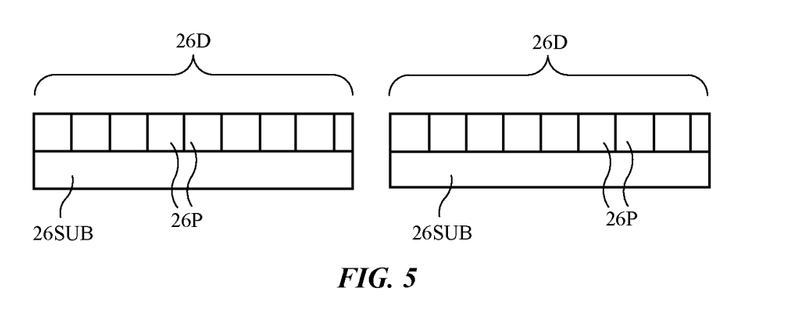
FIG. 5 is a cross-sectional side view of an illustrative display configuration that includes a set of separate displays each of which has a pixel array that displays respective images in accordance with an embodiment.

In supporting multiplexing schemes such as these, it may be desirable to provide device 10 with multiple images (e.g., a first image for displaying in a first image plane, a second image for displaying in a second image plane, a third image for displaying in a third image plane, etc.). With one illustrative arrangement, a single display (e.g., a single liquid-crystal-on-silicon display) may have a single pixel array (e.g., pixel array 26 of FIG. 3) that displays each of these images in sequence. The images may then be presented in multiple different image planes using time division multiplexing. In another illustrative arrangement, a single display may be segmented into multiple areas each of which has its own respective array of pixels and each of which is used in displaying a respective separate one of the multiple images. This type of scheme is shown in the cross-sectional side view of FIG. 4. As shown in FIG. 4, display 26D may have multiple subareas such as areas 26A. Each area 26A may contain an independently adjustable array of pixels 26P. A common substrate 26SUB (e.g., a common silicon die in a liquid-crystal-on-silicon display) may be used to provide display driver circuitry (e.g., pixel circuits, etc.) for all of the pixels 26P in display 26D, even though each area 26A is used to display its own separate image. Areas 26A may be arranged in a row (e.g., a 1×N set of areas 26A may be used to display N respective images in N respective image planes) or areas 26A may be arranged in a rectangular array (e.g., an N×M set of areas may be used to display N×M respective images in N×M respective image planes). If desired, multiple images may be displayed using N separate displays 26D, each with its own respective array of pixels 26P, as shown in FIG. 5. Displays 26D of FIG. 5 may be arranged in a line, in a rectangular array, or other suitable pattern.

Figure 6:
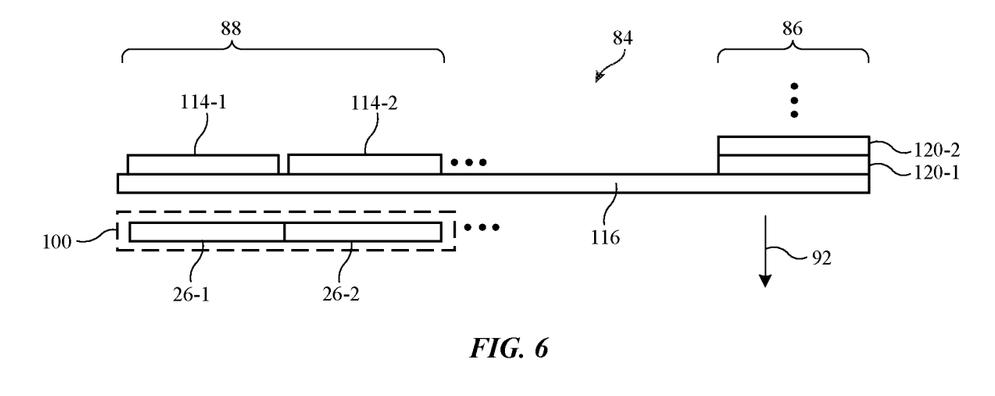
FIG. 6 is a cross-sectional side view of an illustrative optical system having a waveguide, laterally adjacent (tiled) pixel arrays, and associated holographic input couplers and stacked holographic output couplers that are each responsive to light rays with different ranges of angles of orientation for presenting images in multiple image planes in a head-mounted display in accordance with an embodiment.

An illustrative angle-based multiplexing scheme is shown in FIG. 6. In illustrative optical system 84 of FIG. 6, the input coupling system in portion 88 has multiple input couplers 114-1, 114-2 . . . . Each input coupler may receive a respective image from a different pixel array (e.g., pixel array 26-1 may provide a first image to input coupler 114-1, pixel array 26-2 may provide a second image to input coupler 114-2, etc.). This type of arrangement may sometimes be referred to as a tiled (laterally adjacent) arrangement, because each pixel array may be located in a respective laterally adjacent tile position (e.g., a rectangular pixel array location in a series of adjacent rectangular tiles) and the input couplers are laterally adjacent in a tiled pattern.

Pixel arrays 26-1 and 26-2 may be formed from sets of pixels 26P on a single display as shown in FIG. 4 (e.g., pixel arrays 26-1 and 26-2 may be part of the same display and may be formed from a common silicon substrate in a liquid-crystal-on silicon display) or may be formed on separate respective silicon substrates in a liquid-crystal-on-silicon display arrangement (see, e.g., displays 26D of FIG. 5).

Output portion 86 of system 84 may have a stack of overlapping output couplers 120-1, 120-2, . . . . Each output coupler in the output coupler system of FIG. 6 may be sensitive to a different respective angle of light (range of light ray angles of orientation). For example, coupler 120-1 may be configured to efficiently couple light with angles of A1-A2 in direction 92, coupler 120-2 may be configured to couple light with angles A3-A4 in direction 92, etc. The output image from each pixel array may be associated respectively with each of these ranges (e.g., the output from pixel array 26-1 may have light with orientation angles A1-A2, etc.). Input couplers 114-1 may effectively couple light with angles A1-A2 from pixel array 26-1 into waveguide 116, input coupler 114-2 may effectively couple light with angles A3-A4 from pixel array 26-2 into waveguide 116, etc. During propagation of the image light from pixel arrays 26-1, 26-2, etc., the range of angles associated with each image may be preserved. As a result, the image supplied by pixel array 26-1 will be coupled out of waveguide 116 by coupler 120-1, the image supplied by pixel array 26-2 will be coupled out of waveguide 116 by coupler 120-2, etc. Each output coupler may have a different associated focal length (e.g., the focal length of coupler 120-1 may be infinite, so the image coupled out of waveguide 116 may be presented to the user in an image plane located at infinity, the focal length of coupler 120-2 may be 1 meter, so the image coupled out of waveguide 116 may be presented to the user in an image plane located at 1 meter from the user, etc.). This allows system 84 to present multiple images for the user at multiple respective image planes.

Figure 7:
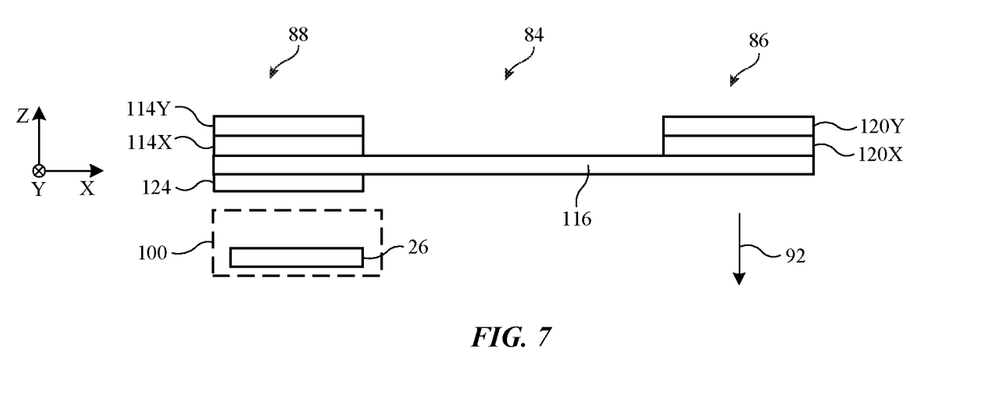
FIG. 7 is a cross-sectional side view of an illustrative optical system with stacked input couplers that are each responsive to a separate respective polarization and stacked output couplers that are each responsive to a separate respective polarization in accordance with an embodiment.

FIG. 7 is a cross-sectional side view of an illustrative polarization-based multiplexing system. As shown in FIG. 7, pixel array 26 may create images that are coupled into waveguide 116 using x-polarization-sensitive input coupler 114X or that are coupled into waveguide 116 using y-polarization sensitive input coupler 114Y. Pixel array 26 may output images with light that is linearly polarized (e.g., along the X axis). Adjustable polarization rotator 124 (e.g., a liquid crystal polarization rotator or other suitable electrically adjustable polarization rotator) may receive control signals from control circuitry 50 that direct rotator 124 to pass light from display 26 through to the input coupler system in portion 88 without any polarization adjustments (e.g., so that the x-polarization of the image provided by display 26 is unchanged) or that direct rotator 124 to rotate the polarization of the light from display 26 by 90° (e.g., to convert the x-polarized light into y-polarized light). Images that are x-polarized are coupled into waveguide 116 using input coupler 114X and images that are y-polarized are coupled into waveguide 116 using input coupler 114Y. The polarization state of the light coupled into waveguide 116 is maintained as this light passes along the length of waveguide 116 to the output coupling system in portion 86. In portion 86, output coupler 120X couples the x-polarized image from waveguide 116 out of waveguide 116 in direction 92. Output coupler 120Y is sensitive to y-polarized light and therefore couples out the y-polarized image from display 26. Couplers 120X and 120Y may have different focal lengths, so that the x-polarized and y-polarized images from display 26 may be displayed in different image planes. If desired, polarization multiplexing techniques may be used in which light is right-hand circularly polarized or left-hand circularly polarized. The use of linearly polarized light (of X or Y polarization) in the example of FIG. 7 is presented as an example.

Figure 8:
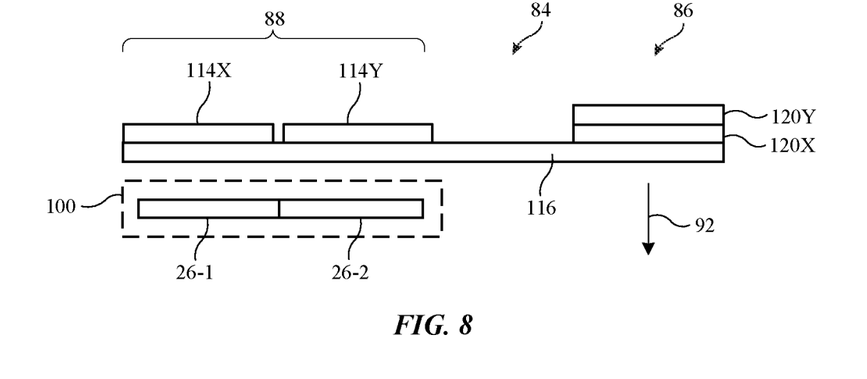
FIG. 8 is a cross-sectional side view of an illustrative optical system with tiled displays and input couplers for different polarizations and stacked output couplers responsive to different polarizations to present images in multiple image planes in accordance with an embodiment.

Another illustrative polarization multiplexing arrangement for optical system 84 is shown in FIG. 8. In the example of FIG. 8, x-polarization input coupler 114X and y-polarization input coupler 114Y are attached to waveguide 116 adjacent to each other along the length of waveguide 116 in a laterally adjacent tiled arrangement and pixel arrays 26-1 and 26-2 are likewise arranged in a tiled fashion. Arrays 26-1 and 26-2 may be formed from subregions of a single display (see, e.g., FIG. 4) or may be formed in separate displays (see, e.g., FIG. 5).

Figure 9:
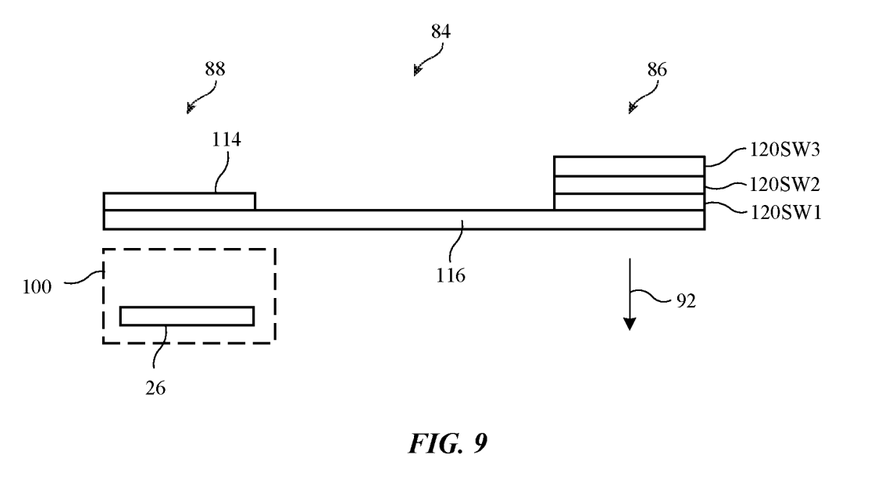
FIG. 9 is a cross-sectional side view of an illustrative optical system with a single input coupler and a stack of switchable output couplers for presenting images in multiple image planes in accordance with an embodiment.

The illustrative arrangement for optical system 84 that is shown in FIG. 9 uses time-division multiplexing to display images from display 26 at multiple image planes. In portion 88 of system 84, input coupler 114 couples images from pixel array 26 of display system 100 into waveguide 116. The light associated with these images propagates from input coupler 114 to an output coupler system in portion 86 of system 84. The output couplers in the output coupler system may include dynamically adjustable output couplers (e.g., switchable holographic liquid crystal coupler elements, switchable MEMs devices, or other dynamically adjustable output coupler devices). Each output coupler can have a different associated focal length, so that light is coupled out of waveguide 116 in multiple image planes. During operation, display 26 outputs a sequence of images I1, I2, I3, . . . , each of which is associated with a respective image plane location. In synchronization with the display of these images by display 26, control circuitry 50 adjusts the states of adjustable output couplers 120SW1, 120SW2, 120SW3, . . . , so that images I1, I2, and I3 are displayed for a user in different image planes. For example, when image I1 is being conveyed to portion 86 via waveguide 116, control circuitry 50 can activate coupler 120SW1 while deactivating couplers 120SW2 and 120SW3. When image I2 is being conveyed to portion 86 via waveguide 116, control circuitry 50 can activate coupler 120SW2 while deactivating couplers 120SW1 (which is transparent when deactivated) and 120SW3. Coupler 120SW3 can be activated and couplers 120SW1 and 120SW2 deactivated while display 26 is outputting image I3. Coupler 120SW1 may direct image I1 in direction 92 with a first optical power (e.g., coupler 120SW1 may have a first focal length), coupler 120SW2 may direct image I2 in direction 92 with a second optical power (e.g., coupler 120SW2 may have a second focal length different from the first focal length), and coupler 120SW3 may direct image I3 in direction 92 with a third optical power (e.g., coupler 120SW3 may have a third focal length different from the first and second focal lengths). In this scenario, image I1 will be presented in a first image plane (e.g., an image plane located a first distance from user 90 that is associated with the first focal length), image I2 will be presented in a second image plane (e.g., an image plane located at a second distance from user 90 that is associated with the second focal length), and image I3 will be presented in a third image plane (e.g., an image plane located at a third distance from user 90 that is associated with the third focal length). Additional switchable output couplers can be included in the stack of switchable output couplers in portion 86, if desired (e.g., to so that additional time-multiplexed image content can be displayed at respective additional image plane locations).

In configurations of the type shown in FIG. 9 and other multiple-focal-plane display configurations for device 10, the frame rate of the images displayed at different image planes may be different. For example, near-field content (e.g., images displayed at the closest image plane location to user 90) may be refreshed more frequently than far-field content (e.g., distant contend such as clouds or distant mountains in a landscape). Configurations in which the images for each image plane location are provided using the same frame rate may also be used, if desired.

Figure 10:
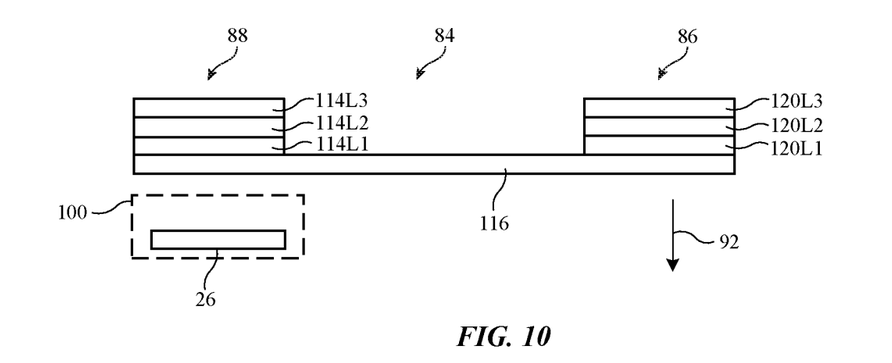
FIG. 10 is a cross-sectional side view of an illustrative optical system with a display that supplies light of multiple different wavelengths to stacked input couplers that are responsive to light at different respective wavelengths or sets of wavelengths and that has multiple stacked output couplers each of which is responsive to a different one of the wavelengths or sets of wavelengths to present images in multiple image planes in accordance with an embodiment.

In the illustrative configuration of FIG. 10, wavelength division multiplexing is being used to present a user with images in multiple image planes. Pixel array 26 of FIG. 10 is configured to produce images at multiple wavelengths (e.g., a first image at a first wavelength such as a red wavelength, a second image at a second wavelength such as a green wavelength, and a third image at a third wavelength such as a blue wavelength). During operation, control circuitry 50 may direct display 26 to display the red image, the blue image, and the green image in sequence. These images are conveyed to an output coupler system in portion 86. The output coupler system may include stacked output couplers that are configured to direct light out of waveguide 116 in direction 92 at different wavelengths. For example, coupler 120L1 may direct red images in direction 92 without affecting blue and green images, coupler 120L2 may direct green images in direction 92 without affecting red and blue images, and coupler 120L3 may direct blue images in direction 92 without affecting red and green images. Output couplers 120L1, 120L2, and 120L3 may have different focal lengths, so that the red, green, and blue images are displayed at different image plane locations. If desired, there may be multiple different red output couplers, each of which has a different red wavelength of operation (e.g., red wavelengths that are offset from each other by 20 nm or other suitable amount) and each of which has a different focal length. Likewise, green and blue images may be displayed in different image planes by using multiple stacked green output couplers (each with a different green wavelength of operation and different focal length) and multiple stacked blue output couplers (each with a different blue wavelength of operation and different focal length). In configurations such as these, pixel array 26 of display system 100 may be configured to produce images respectively at each of the red wavelengths, each of the green wavelengths, and each of the blue wavelengths, thereby presenting a user with full color images in multiple different image planes.

Figure 11:
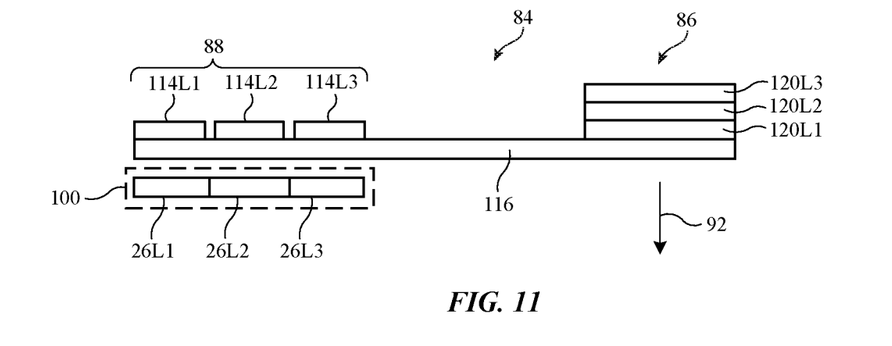
FIG. 11 is a cross-sectional side view of an illustrative optical system having multiple tiled pixel arrays that produce images of different respective wavelengths and that are overlapped with input couplers that operate at different respective wavelengths and having stacked output couplers that operate at different wavelengths for presenting images in multiple image planes in accordance with an embodiment.

The illustrative configuration of system 84 that is shown in FIG. 11 uses tiled pixel arrays 26L1, 26L2, 26L3, etc., each of which output images of a different respective wavelength. Pixel arrays 26L1, 26L2, 26L3, etc. may be formed on a common display substrate or multiple separate display substrates may be provided each of which includes a single pixel array or a group of multiple pixel arrays.

Figure 12:
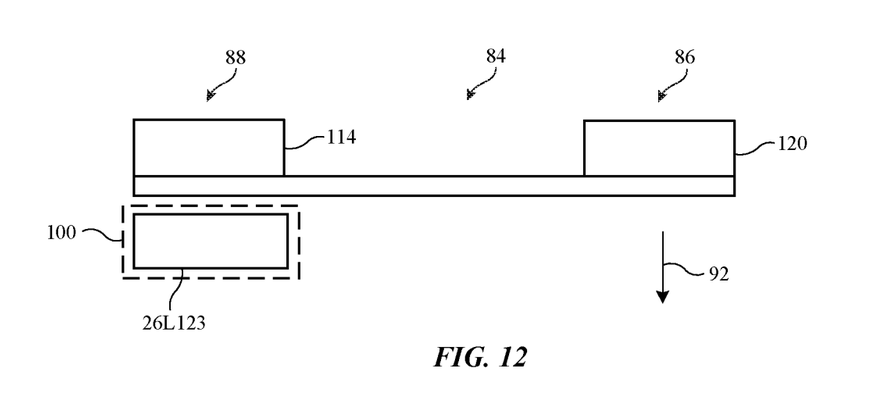
FIG. 12 is a cross-sectional side view of an illustrative optical system with a display that supplies light of multiple different wavelengths to a multiwavelength input coupler and that has a multiwavelength output coupler that presents images in multiple image planes in accordance with an embodiment.

FIG. 12 is a diagram of an illustrative configuration for optical system 84 in which pixel array 26 of display system 100 displays images with different respective wavelengths (e.g., sequential red, green, blue images or sequential images at a set of different red wavelengths, a set of different green wavelengths, and a set of different blue wavelengths, etc.) and in which input-coupler 114 and output coupler 120 are each configured to couple light at each of these wavelengths respectively into or out of waveguide 116. Multiwavelength couplers may be used in place of stacked couplers that operate at different respective wavelengths in the system of FIG. 12 and/or the other illustrative optical systems 84 for device 10.

Figure 13:
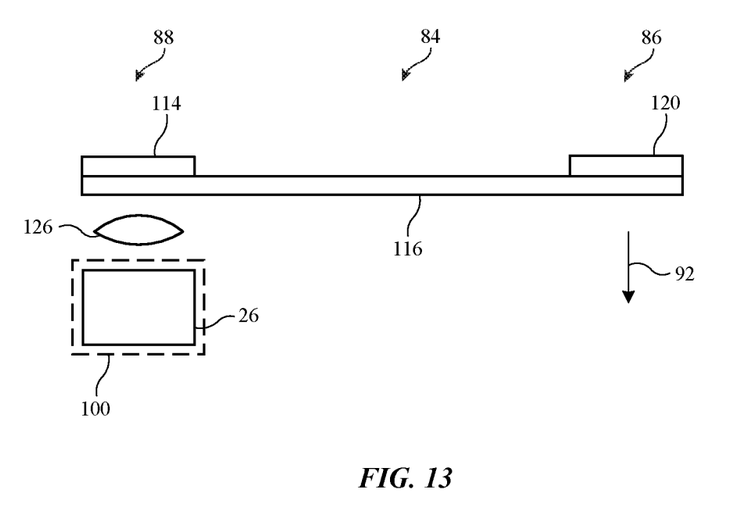
FIG. 13 is a diagram of an illustrative optical system with a tunable lens, a waveguide, and input and output couplers for presenting images in multiple image planes in accordance with an embodiment.

If desired, a tunable lens may be used to present a user with images in multiple different image planes. Consider, as an example, the illustrative configuration of optical system 84 in FIG. 13. In optical system 84 of FIG. 13, tunable lens 126 has been interposed between pixel array 26 of display system 100 and input portion 88 of system 84. Optical coupler 114 in portion 88 may be used to couple light from pixel array 26 into waveguide 116. In output portion 86, output coupler 120 may be used to direct light for the images from pixel array 26 towards a user in direction 92. During operation, pixel array 26 may generate a series of images for different associated image planes. As each image is output from pixel array 26, control circuitry 50 may adjust lens 126 so that lens 126 exhibits a respective focal length. Lens 126 may be a tunable liquid crystal lens or other adjustable lens. By adjusting lens 126 to different focal lengths in synchronization with the different images produced by pixel array 26, images may be presented to user 90 in direction 92 at a variety of different respective image planes. If desired, tunable lenses such as lens 126 may be placed between output coupler 120 and the user. In this type of arrangement, a compensating adjustable lens (dynamically adjusted to exhibit the opposite focal length to that of lens 126) may be placed between coupler 120 and external objects such as object 30 (FIG. 3) so that the user's view of real-world objects is not defocused by the focal length adjustments made to lens 126.

Figure 14:
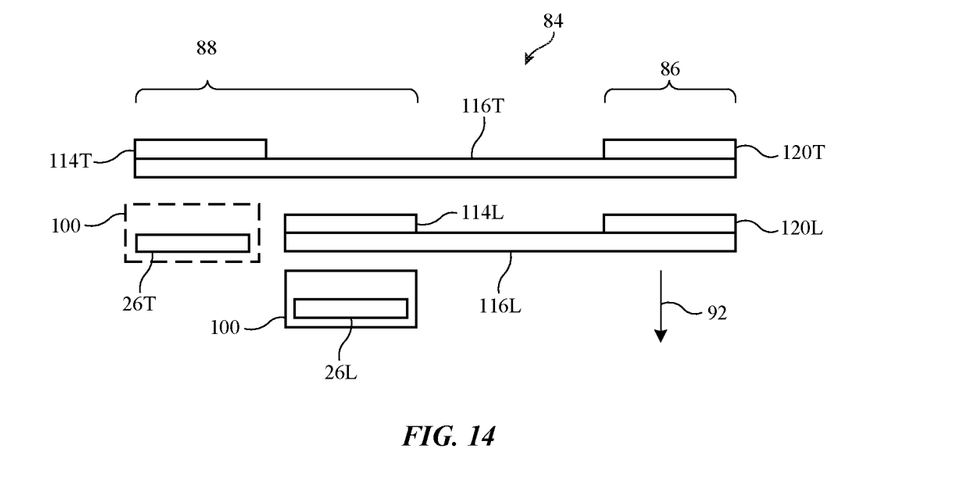
FIG. 14 is a cross-sectional side view of an illustrative optical system with multiple waveguides and tiled laterally adjacent input couplers in accordance with an embodiment.

As shown in FIG. 14, optical system 84 may have multiple waveguides 116 (e.g., a first waveguide 116L, a second waveguide 116T, and, if desired, one or more additional waveguides 116). The waveguides may overlap each other as shown in FIG. 14 or may be arranged in a non-overlapping or partly overlapping layout. Each waveguide may receive images from a single pixel array or from a tiled set of pixel arrays. In the example of FIG. 14, optical system 84 has a first pixel array 26T that provides images to waveguide 116T via input coupler 114T in input portion 88 and has a second pixel array 26L that provides images to waveguide 116L via input coupler 114L in input portion 88. Input couplers 114T and 114L may be volume holograms that couple incoming plane waves to outgoing plane waves (sometimes referred to as a plane-to-plane volume holograms or plane-to-plane input couplers).

Output couplers 120L and 120T may be stacked in portion 86 of optical system 84. Output coupler 120L may have a first focal length (e.g., output coupler 120L may be a plane-to-plane output coupler having an infinite focal length) and output coupler 120T may have a second focal length that is different from the first focal length (e.g., the second focal length may be a finite focal length). With this type of arrangement, images from pixel array 26L may be provided to a user in an image plane located at infinity and images form pixel array 26T may be provided to a user in an image plane at a finite distance from the user. Additional waveguides, additional input and output couplers, and additional pixel arrays may be used in displaying images in additional image planes, if desired.

Pixel arrays 26T and 26L may operate at the same wavelengths or different wavelengths. With one illustrative configuration, pixel array 26T may provide light at a first set of wavelengths (a first red wavelength R1, a first green wavelength G1, and a first blue wavelength B1) and pixel array 26L may provide light at a second set of wavelengths (a second red wavelength R2, a second green wavelength G2, and a second blue wavelength B2). Configurations with different sets of wavelengths for pixel arrays 26T and/or 26L may be used, if desired.

Figure 15:
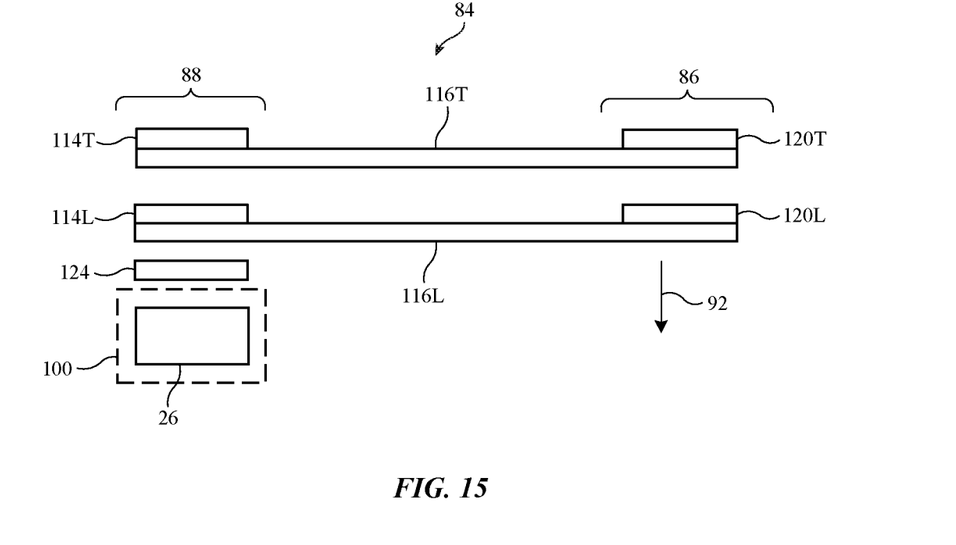
FIG. 15 is a cross-sectional side view of an illustrative optical system with multiple waveguides and stacked input and output couplers in accordance with an embodiment.

The illustrative configuration for optical system 84 of FIG. 15 has multiple waveguides 116T and 116L. Input portion 88 of optical system 84 has a stacked set of input couplers 114L and 114T, each of which couples image light into a respective one of waveguides 116L and 116T. System 84 of FIG. 15 may use a multiplexing scheme such as a wavelength of polarization multiplexing scheme or other multiplexing arrangement. As an example, system 84 may have an adjustable polarization rotator such as polarization rotator 124. Pixel array 36 of display system 100 may generate linearly polarized images. Input couplers 114L and 114T may be sensitive to light with orthogonal polarizations, so that when rotator 124 is in a first state, image light from pixel array 26 is coupled into waveguide 116L by coupler 114L and that when rotator 124 is in a second state (a state that rotates image polarization by 90°, image light from pixel array 26 passes through coupler 114L and is coupled into waveguide 116T by coupler 114T.

In general, any suitable combination of tunable lenses, wavelength multiplexing, time division multiplexing, polarization multiplexing, single and/or multiple waveguides, overlapping or non-overlapping waveguides, and single pixel arrays and/or tiled patterns of multiple laterally adjacent pixel arrays, may be used in system 84 to display images at multiple different focal lengths for a user. The configurations of FIGS. 5-15 are illustrative.

In accordance with an embodiment, an electronic device is provided that includes a display system having a plurality of laterally adjacent pixel arrays arranged in a tiled pattern, the pixel arrays are configured to produce images, and an optical system having an input portion and an output portion, the optical system is configured to display the images in multiple image planes and the optical system includes a waveguide that extends between the input portion and the output portion, an input coupler system having a plurality of laterally adjacent input couplers arranged in a tiled pattern in the input portion, each of the input couplers is configured to couple images from a respective one of the pixel arrays into the waveguide, and an output coupler system that is configured to couple images out of the waveguide in the output portion, the output coupler system is configured to present the images from each of the laterally adjacent pixel arrays in a different respective image plane.

In accordance with another embodiment, the electronic device includes a head-mounted support structure configured to support the display system and the optical system.

In accordance with another embodiment, the output coupler system includes a plurality of stacked output couplers in the output portion and each output coupler has a different respective focal length and is configured to couple images out of the waveguide from a different respective one of the pixel arrays.

In accordance with another embodiment, the stacked output couplers are holographic output couplers.

In accordance with another embodiment, each of the holographic output couplers is configured to couple light of a different respective wavelength out of the waveguide.

In accordance with another embodiment, each of the volume holographic output couplers is configured to couple light of a different respective polarization out of the waveguide.

In accordance with another embodiment, each of the holographic output couplers is configured to couple light with a different respective range of angles of orientation out of the waveguide.

In accordance with another embodiment, the laterally adjacent pixel arrays are formed on a common silicon substrate.

In accordance with another embodiment, each of the laterally adjacent pixel arrays is formed on a different respective silicon substrate.

In accordance with another embodiment, the pixel arrays include liquid-crystal-on-silicon pixel arrays and the waveguide has an elongated strip shape.

In accordance with an embodiment, an electronic device is provided that includes a display system configured to produce images, an optical system configured to display the images in multiple image planes, the optical system includes a waveguide having first and second opposing ends, an input coupler system at the first end having a stack of plane-to-plane holographic input couplers to couple the images into the waveguide, an output coupler system at the second end that has a stack of holographic output couplers each of which has a different respective focal length, and a head-mounted support structure configured to support the display system and the optical system.

In accordance with another embodiment, the display system is configured to produce a plurality of images each of which is associated with image light at a different set of wavelengths.

In accordance with another embodiment, the electronic device includes an adjustable polarization rotator between the display system and the input coupler system.

In accordance with another embodiment, the display system includes a liquid-crystal-on-silicon pixel array and a light source with light-emitting diodes.

In accordance with another embodiment, the stack of output couplers includes at least one plane-to-plane output coupler.

In accordance with an embodiment, an electronic device is provided that includes a display system having a plurality of pixel arrays, the pixel arrays include at least a first pixel array configured to produce first images and a second pixel array configured to produce second images, a first waveguide, a second waveguide, a first plane-to-plane holographic coupler configured to couple the first images into the first waveguide, a second plane-to-plane holographic coupler configured to couple the second images into the second waveguide, and an output coupler system configured to display the first and second images in different respective first and second image planes, the output coupler system includes a first holographic coupler with a first focal length configured to couple the first images out of the first waveguide and a second holographic coupler with a second focal length configured to couple the second images out of the second waveguide.

In accordance with another embodiment, the first and second pixel arrays are formed on respective first and second silicon substrates.

In accordance with another embodiment, the first and second pixel arrays are formed on a common silicon substrate.

In accordance with another embodiment, the first and second holographic output couplers overlap in an output coupler stack and the first images pass through the second holographic output coupler.

In accordance with another embodiment, the first and second pixel arrays include liquid-crystal-on-silicon pixel arrays.

The foregoing is merely illustrative and various modifications can be made to the described embodiments. The foregoing embodiments may be implemented individually or in any combination.

What is claimed is:

1. An electronic device, comprising:
a plurality of laterally adjacent pixel arrays arranged in a tiled pattern, wherein the pixel arrays are configured to produce images; and
an optical system having an input portion and an output portion, wherein the optical system is configured to display the images in multiple image planes and wherein the optical system comprises:
a waveguide that extends between the input portion and the output portion;
a plurality of laterally adjacent input couplers arranged in a tiled pattern at the input portion, wherein each of the input couplers is configured to couple images from a respective one of the pixel arrays into the waveguide; and
an output coupler system that is configured to couple images out of the waveguide at the output portion, wherein the output coupler system is configured to present the images from each of the laterally adjacent pixel arrays in a different respective image plane.

2. The electronic device defined in claim 1 further comprising a head-mounted support structure configured to support the plurality of laterally adjacent pixel arrays and the optical system.

3. The electronic device defined in claim 2 wherein the output coupler system comprises a plurality of stacked output couplers in the output portion and wherein each output coupler has a different respective focal length and is configured to couple images out of the waveguide from a different respective one of the pixel arrays.

4. The electronic device defined in claim 3 wherein the stacked output couplers are holographic output couplers.

5. The electronic device defined in claim 4 wherein each of the holographic output couplers is configured to couple light of a different respective wavelength out of the waveguide.

6. The electronic device defined in claim 4 wherein each of the holographic output couplers is configured to couple light of a different respective polarization out of the waveguide.

7. The electronic device defined in claim 4 wherein each of the holographic output couplers is configured to couple light with a different respective range of angles of orientation out of the waveguide.

8. The electronic device defined in claim 4 wherein the laterally adjacent pixel arrays are formed on a common silicon substrate.

9. The electronic device defined in claim 4 wherein each of the laterally adjacent pixel arrays is formed on a different respective silicon substrate.

10. The electronic device defined in claim 1 wherein the pixel arrays comprise liquid-crystal-on-silicon pixel arrays and wherein the waveguide has an elongated strip shape.

11. An electronic device, comprising:
a first pixel array configured to produce first images and a second pixel array configured to produce second images;
a first waveguide;
a second waveguide;
a first optical coupler configured to couple the first images into the first waveguide;
a second optical coupler configured to couple the second images into the second waveguide;
a third optical coupler with a first focal length configured to couple the first images out of the first waveguide; and
a fourth optical coupler with a second focal length configured to couple the second images out of the second waveguide.

12. The electronic device defined in claim 11 wherein the third optical coupler comprises a first holographic coupler and the fourth optical coupler comprises a second holographic coupler.

13. The electronic device defined in claim 11 wherein the first optical coupler comprises a first holographic coupler and the second optical coupler comprises a second holographic coupler.

14. The electronic device defined in claim 11 wherein the first and second pixel arrays comprise liquid-crystal-on-silicon pixel arrays.

15. The electronic device of claim 11 wherein the first optical coupler comprises a plane-to-plane holographic optical coupler.

16. An electronic device comprising:
a first pixel array;
a second pixel array laterally adjacent to the first pixel array, the first and second pixel arrays being configured to produce images;
a waveguide;
a first input coupler on the waveguide and configured to couple the images produced by the first pixel array into the waveguide;
a second input coupler on the waveguide and configured to couple the images produced by the second pixel array into the waveguide; and
an output coupler system configured to couple the images out of the waveguide, wherein the output coupler system is configured to present, in a first image plane, the images coupled into the waveguide by the first input coupler, and is configured to present, in a second image plane different from the first image plane, the images coupled into the waveguide by the second input coupler.

17. The electronic device of claim 16, wherein the first and second pixel arrays are arranged in a tiled pattern.

18. The electronic device of claim 17, wherein the first and second input couplers are arranged in a tiled pattern at a first end of the waveguide and the output coupler system is disposed at a second end of the waveguide.

19. The electronic device of claim 16, wherein the first and second input couplers are arranged in a tiled pattern at a first end of the waveguide and the output coupler system is disposed at a second end of the waveguide.

20. The electronic device of claim 16, wherein the images generated by the first and second pixel arrays comprise red, green, and blue wavelengths.

* * * * *